(12) United States Patent
Komppa et al.

(10) Patent No.: US 12,263,930 B2
(45) Date of Patent: Apr. 1, 2025

(54) MOUNTING STRUCTURE, MOUNTING ARRANGEMENT, PROPULSION UNIT, FLOATING STRUCTURE AND METHOD FOR MOUNTING PROPULSION UNIT TO FLOATING STRUCTURE

(71) Applicant: ABB Schweiz AG, Baden (CH)

(72) Inventors: Renny Komppa, Tuusula (FI); Mikael Björklund, Helsinki (FI); Petri Säkkinen, Helsinki (FI); Sebastian Buddas, Helsinki (FI); Mikko Kuitunen, Helsinki (FI); Jukka Myllyluoma, Helsinki (FI)

(73) Assignee: ABB Schweiz AG, Baden (CH)

( * ) Notice: Subject to any disclaimer, the term of this patent is extended or adjusted under 35 U.S.C. 154(b) by 7 days.

(21) Appl. No.: 18/191,607

(22) Filed: Mar. 30, 2022

(65) Prior Publication Data

US 2023/0294810 A1 Sep. 21, 2023

(30) Foreign Application Priority Data

Mar. 30, 2022 (EP) ..................... 22165420

(51) Int. Cl.
*B63H 21/30* (2006.01)
*B63H 20/08* (2006.01)
(Continued)

(52) U.S. Cl.
CPC .............. *B63H 21/30* (2013.01); *B63H 5/07* (2013.01); *B63H 5/125* (2013.01);
(Continued)

(58) Field of Classification Search
CPC .......... B63H 20/06; B63H 21/30; B63H 5/07; B63H 5/125; B63H 73/20; B63H 2020/025; B63H 2025/1258; F16M 11/06
See application file for complete search history.

(56) References Cited

U.S. PATENT DOCUMENTS 4,036,163 A * 7/1977 Pehrsson ................ B63B 71/00
114/151
4,921,457 A * 5/1990 Yoshida ................ B63H 21/30
440/75
(Continued)

FOREIGN PATENT DOCUMENTS

CN 102963516 A 3/2013
EP 3072807 A1 * 9/2016 ............ B63B 71/00
(Continued)

OTHER PUBLICATIONS

Japanese Office Action; Application No. JP2023-054451; Issued: Apr. 2, 2024; 5 Pages.
European Search Report; Application No. EP 22 16 5420; Issued: Oct. 13, 2022; 2 Pages.

*Primary Examiner* — Tan Le
(74) *Attorney, Agent, or Firm* — Whitmyer IP Group LLC

(57) ABSTRACT

A mounting structure for mounting a propulsion unit to a hull of a floating structure includes a first mounting surface and a sealed portion provided on the first mounting surface for sealing the propulsion unit to the hull. The first mounting surface is further provided with a pivot point provided at an edge or in the vicinity of an edge of the first mounting surface and outside the sealed portion, and at least two first protrusions spaced from each other on the first mounting surface. Each of the first protrusions includes a surface at least on a side of the first protrusion facing away from the pivot point, which surface is formed at least in a direction perpendicular to the first mounting surface in a manner dependent of a distance between the pivot point and the surface in such a manner that the first protrusion provided in a cylindrical cavity formed in a counterpart is configured to guide a mutual tilting movement of the cylindrical cavity and the first protrusion, when the mounting structure and, (Continued)

thus, the first protrusions are tilted with respect to the cylindrical cavities about the pivot point.

20 Claims, 6 Drawing Sheets

(51) Int. Cl.
*F16M 11/06* (2006.01)
*B63H 5/07* (2006.01)
*B63H 5/125* (2006.01)
*B63H 20/02* (2006.01)
*B63H 20/06* (2006.01)

(52) U.S. Cl.
CPC ............... *B63H 2005/1258* (2013.01); *B63H 2020/025* (2013.01); *B63H 20/06* (2013.01); *B63H 20/08* (2013.01); *F16M 11/06* (2013.01)

(56) References Cited

U.S. PATENT DOCUMENTS

| | | | |
|---|---|---|---|
| 5,097,603 A * | 3/1992 | Hirsch | ............... G01B 3/002 |
| | | | 33/501.5 |
| 6,609,939 B1 | 8/2003 | Towner et al. | |
| 9,114,864 B2 | 8/2015 | Schlintz | |
| 9,446,828 B1 | 9/2016 | Groeschel et al. | |
| 2015/0038028 A1 | 2/2015 | Schlintz | |
| 2023/0174212 A1* | 6/2023 | Von Porat | ............. B63H 20/06 |
| | | | 440/3 |

FOREIGN PATENT DOCUMENTS

| | | | | |
|---|---|---|---|---|
| EP | 4253223 A1 * | 10/2023 | ............ | B63H 20/06 |
| JP | S5926397 A | 2/1984 | | |
| JP | 61057489 A | 3/1986 | | |
| JP | 2013052863 A | 3/2013 | | |

* cited by examiner

MOUNTING STRUCTURE, MOUNTING ARRANGEMENT, PROPULSION UNIT, FLOATING STRUCTURE AND METHOD FOR MOUNTING PROPULSION UNIT TO FLOATING STRUCTURE

TECHNICAL FIELD

The present disclosure relates to floating structures, and particularly to a mounting structure for mounting a propulsion unit to a floating structure. The present disclosure further concerns a mounting arrangement, a propulsion unit, and a method for mounting a propulsion unit to a floating structure.

BACKGROUND

Propulsion units consist of many components that may require maintenance and service actions. Some of the actions even necessitate either docking, mounting, removal and/or replacement of the propulsion unit in order to perform the needed operations.

Docking of the whole floating structure, such as a marine vehicle like a ship, is a time consuming and expensive operation and there are quite few docks available. In case of a semisubmersible rig-type drilling platform docking is practically impossible. Therefore, a removal and installing of the propulsion unit under water has been a useful course of action. There are several solutions to perform the underwater installations of the propulsion unit.

Lifting with conventional lifting means takes place in a vertical direction. However, it is in some cases beneficial to mount propulsion members in a position tilted with respect to the vertical direction. If this involves providing a hull of a floating structure with a tilted mounting surface, a lot of care and high skill level is required from the operator, because there is a high risk of damaging the sealing during mounting, when heavy metal objects move towards each other at an angle and may cut to the seal.

To solve this problem, solutions with mounting surfaces of the hull and the propulsion unit provided in a horizontal position have been developed, where the propulsion members are tilted within the propulsion unit. However, a problem with this approach is that it increases a number of different kinds of propulsion units to be manufactured. Also mounting such propulsion units to the hull is often very difficult.

SUMMARY

An object of the present disclosure is to provide a new a mounting structure, mounting arrangement, propulsion unit, floating structure, and a method for mounting a propulsion unit to a floating structure.

The object of the disclosure is achieved by a method, a mounting structure, a mounting arrangement, a propulsion unit, and a floating structure which are characterized by what is stated in the independent claims. Some embodiments of the disclosure are disclosed in the dependent claims.

The disclosure is based on the idea of providing the propulsion unit and/or the hull of the floating structure with structures guiding their mounting surfaces to tilt about a pivot point in a correct position until the mounting surfaces are brought to positions substantially parallel to each other. In such a correct position, possible mounting openings and other features provided in a mounting structure may preferably be aligned with corresponding mounting openings and other features provided in a counterpart, for instance in the propulsion unit and the hull. These guiding structures are called for instance protrusions and cylindrical cavities in this disclosure.

An advantage of the solution of the disclosure is that the propulsion unit can be mounted to the hull of the floating structure from under the hull to a tilted mounting surface provided in the hull without damaging the sealing between these parts. This enables simplified under-water mounting of the propulsion unit to the floating structure. In addition, manufacturing may be easier, less propulsion unit variants may be needed, and, in some embodiments, better hydrodynamic characteristics may be obtained.

BRIEF DESCRIPTION OF THE DRAWINGS

In the following the disclosure will be described in greater detail by means of different embodiments with reference to the accompanying drawings, in which.

The drawings are provided for illustrative purposes only and are not presented to scale. Some non-relevant features may be omitted and only a part of similar features may be provided with reference signs for the sake of clarity. Not all the features are numbered in all drawings.

DETAILED DESCRIPTION

Figure 1:
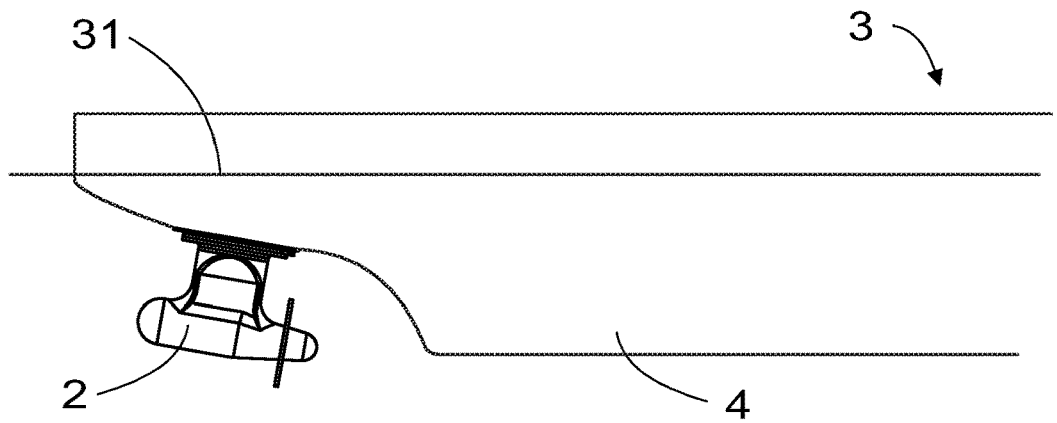
FIG. 1 illustrates a floating structure schematically seen from a side.

FIG. 1 illustrates a floating structure schematically seen from a side. It is clear for a skilled person that the floating structure in the figure is very simplified and only intended to illustrate some features and terms related to floating structures. A floating structure may comprise a marine vehicle, such as a ship, particularly a ship the docking of which is difficult, or another type of a floating structure, such as a semisubmersible rig or another type of a drilling platform. A marine vehicle may, thus, comprise a ship or another type of a self-propelled vehicle intended to be used in or on water. Besides marine vehicles, floating structures may also comprise structures intended to float on or in water, which may be provided with propulsion units for long- or short-range movement.

A floating structure 3 may comprise a hull 4 and a propulsion unit 2. It is clear for a person skilled in the art that such a floating structure typically also includes a high number of other structural parts that are not described here in more detail.

The propulsion unit 2 may comprise a propulsion unit used in an azimuthal propulsion system. According to an embodiment, such a propulsion unit may be connected to the hull 4 of the floating structure via a slewing bearing. When such a propulsion unit is turned around its vertical axis, the direction of the propulsion force is deviated from the longitudinal axis of the ship and the propulsion unit steers the ship.

The propulsion unit 2 may be mechanical or electrical. In other words, the propulsion unit 2 may be driven mechanically or electrically. If an azimuthal propulsion unit is mechanical, a driving unit is normally located inside the hull of the floating structure. The driving unit may be an electric motor or a combustion motor like diesel. In such embodiments, the propulsion power may be transmitted via mechanical gears and shafts to the propeller. If the propulsion unit is electrical, propulsion power is lead to the propulsion unit via electric cables or via bus bars to the electric motor that locates inside the propulsion unit. According to an embodiment, the propulsion unit 2 may comprise a podded electrical drive where no mechanical gears are used. In such embodiments, the propeller may be connected directly to a shaft of the electric motor without a gear.

The propulsion unit 2 is attached to the hull 4 under the waterline 31 of the floating structure. In other words, the area at which the propulsion unit is connected to the hull 4 is provided under water, when the floating structure 3 is provided in normal use conditions. The upper part of the propulsion unit 2 is, thus, preferably attached to the hull 4 in a watertight manner. The propulsion unit 2 may comprise a slewing bearing 28 so that the lower part of the propulsion unit may be turned around a vertical axis and/or an axis perpendicular to a plane defined by the first mounting surface 5. Such slewing bearings 28 are known in the art and are not discussed here in more detail.

Figure 2:
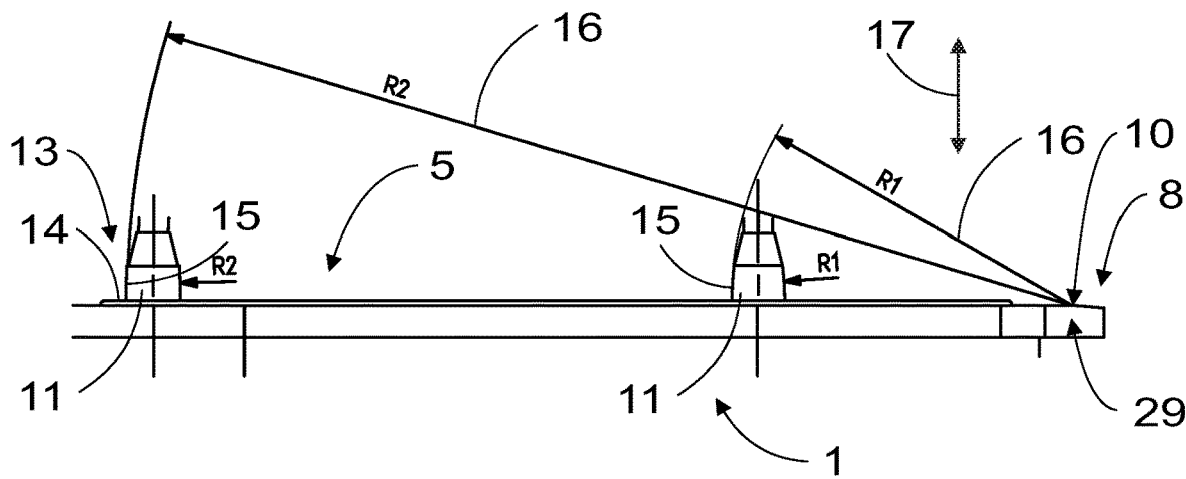
FIG. 2 shows a mounting structure for a propulsion unit of a floating structure for mounting the propulsion unit to a hull of the floating structure in cross section seen from a side.
Figure 4:
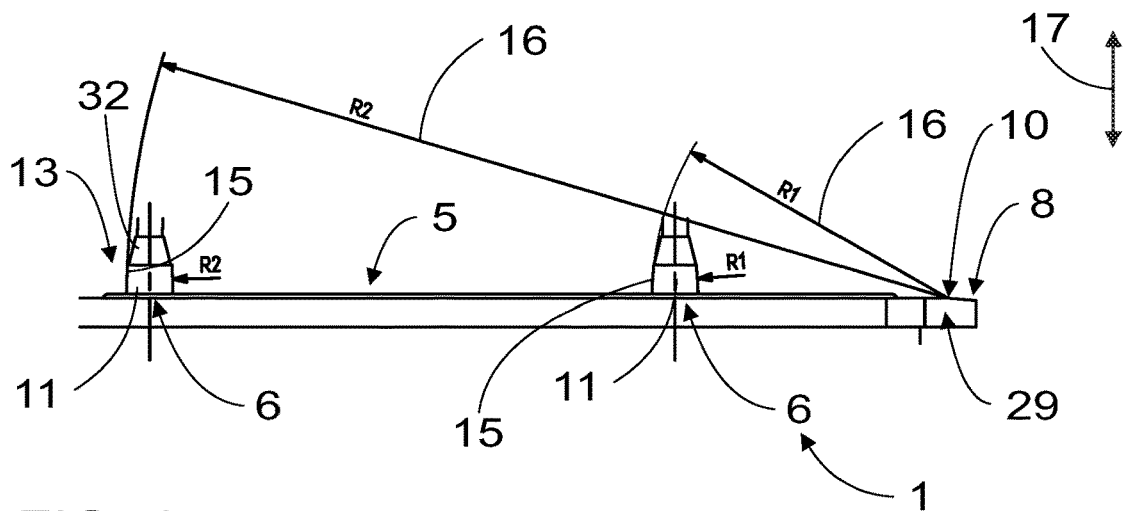
FIG. 4 shows a mounting structure for a propulsion unit of a floating structure for mounting the propulsion unit to a hull of the floating structure according to another embodiment in cross section seen from a side.
Figure 5:
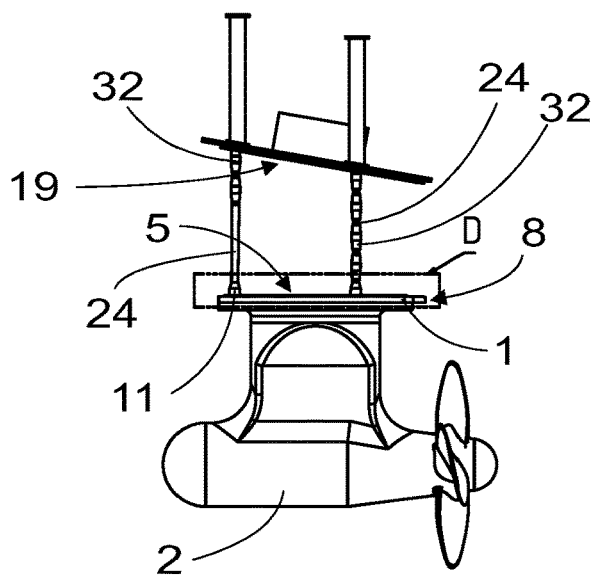
FIGS. 5-8 illustrate different phases and positions of mounting a propulsion unit to a floating structure according to an embodiment seen from a side and partly transparently.
Figure 6:
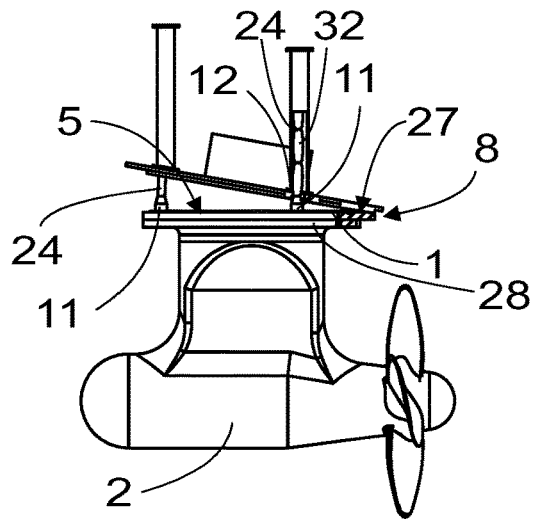
Figure 7:
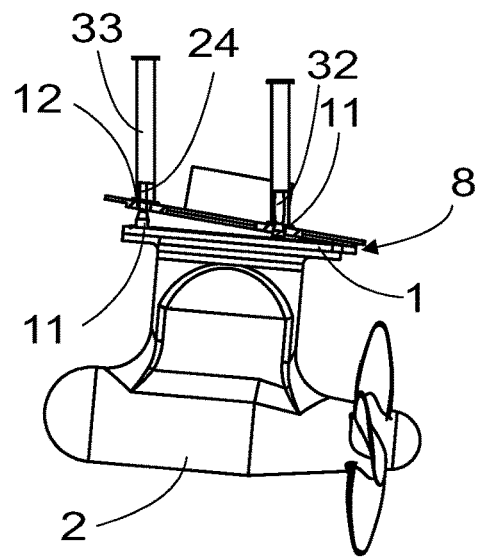
Figure 8:
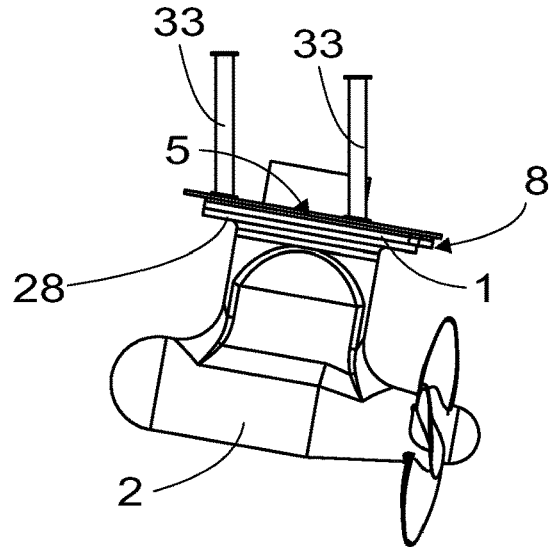

FIG. 2 shows a mounting structure 1 for mounting a propulsion unit 2 to a hull 4 of a floating structure in cross section seen from a side. FIG. 4 shows a mounting structure for a propulsion unit of a floating structure for mounting the propulsion unit to a hull of the floating structure according to another embodiment in cross section seen from a side; The propulsion unit 2 may, thus, be a propulsion unit of the floating structure 3.

The mounting structure 1 comprises a first mounting surface 5. The mounting structure 1 according to FIG. 2 further comprises a sealed portion 6 provided on the first mounting surface 5 for sealing the propulsion unit 2 to the hull 4. More particularly, the sealed portion 6 is a portion of the first mounting surface 5 configured to be closed within a water-tight sealing, when the propulsion unit 2 is mounted to the hull 4. Depending on the embodiment, the mounting structure 1 may be provided as a part of the propulsion unit 2, as a part of the hull 4 or as a separate structural part configured to be mounted to the propulsion unit 2, the hull 4 or between the propulsion unit 2 and the hull 4.

The first mounting surface 5 of the mounting structure 1, such as the mounting structure 1 according to FIG. 2 or 4, is provided with a pivot point 10 provided at an edge 8 or in the vicinity of an edge 8 of the first mounting surface 5 and outside the sealed portion 6. In other words, the pivot point 10 is provided in an area between the sealed portion 6 and the outer edge 8 of the first mounting surface 5. Depending on the embodiment, the pivot point 10 may comprise a virtual point-like or line-like pivot point, in other words a hinge point or hinge edge, about which tilting takes place, or one or more grooved and/or protruding shapes formed at the pivot point in the first mounting surface 5. According to an embodiment, the one or more grooved and/or protruding shapes formed in the first mounting surface 5 may also be configured, at least partly, to guide and/or limit mutual tilting of two parts described in this description and accompanying claims, and the direction in which the tilting can take place.

The first mounting surface 5 of the mounting structure 1 according to FIG. 2 is further provided with at least two first protrusions 11 spaced from each other on the first mounting surface 5. Each of the first protrusions 11 comprises a surface 15 at least on a side of the first protrusion 11 facing away from the pivot point 10, which surface 15 is formed at least in a direction 17 perpendicular to the first mounting surface in a manner dependent of a distance 16 between the pivot point 10 and the surface 15 in such a manner that the first protrusion 11 provided in a cylindrical cavity formed in a counterpart is configured to guide a mutual tilting movement of the cylindrical cavity and the first protrusion 11, when the mounting structure 1 and, thus, the first protrusions 11 are tilted with respect to the cylindrical cavities, and thus the counterpart, about the pivot point 10. The first protrusion 11 may comprise a feature protruding from the first mounting surface 5 towards the counterpart. The counterpart may comprise a structural part of the floating structure, the propulsion unit 2, the hull 4 or some other structural part, such as a separate mounting structure, involved in mounting the propulsion unit 2 to the floating structure, or to the rest of the floating structure, for instance to the hull 4. According to an embodiment, the surface 15 is, instead of or in addition to being configured to guide the mutual tilting movement of the cylindrical cavity and the first protrusion 11, formed and positioned on the first mounting surface 5 in such a manner that the first protrusion 11 provided in a cylindrical cavity is configured to align the first mounting surface 5 and the second mounting surface 19, when the mounting structure 1 and, thus, the first protrusions 11 are tilted with respect to the cylindrical cavities about the pivot point 10.

According to an embodiment, such as the embodiment of FIG. 2 or FIG. 4, the surface 15 may, more particularly, comprise a curved surface. The curved surface 15 may be curved at least in a direction 17 perpendicular to the first mounting surface in such a manner that the first protrusion 11 provided in the cylindrical cavity formed in the counterpart is configured to maintain a contact with the cylindrical cavity, when the mounting structure and, thus, the first protrusions are tilted with respect to the cylindrical cavities about the pivot point 10. According to an embodiment, the contact may be a point contact, preferably a line contact and most preferably a surface contact. In this context, a line contact means that the points of the first protrusion 11 and the cylindrical cavity placed against each other at a given position during the mutual tilting movement form a line-like shape. Depending on the embodiment, the line-like shape may be a straight line, a curved line, or a combination thereof. Similarly, a surface contact means that the points of the first protrusion 11 and the cylindrical cavity placed against each other at a given position during the mutual tilting movement form a surface-like shape. A surface-like shape comprises points spaced from each other in a manner defining at least two dimensions for the shape. Maintaining such a contact means that the point contact, line contact or surface contact is formed at a plurality of positions during the mutual tilting movement, preferably during the rest of the mutual tilting movement from the position where the point contact, line contact or surface contact is first formed until the end of the tilting movement. Depending on the embodiment, the exact shape of the point contact, line contact or surface contact may either stay the same or vary at the plurality of positions during the mutual tilting movement.

According to an embodiment, the first mounting surface 5 may comprise a round shape with a round outer edge. The round shape of the first mounting surface 5 may be for instance circular or annular. According to an embodiment, the round outer edge may be provided with an extended portion 29 at one side of the first mounting surface 5. In other words, the round shape of the first mounting surface 5 may comprise an extended portion 29 extending outside the round, for instance circular or annular, shape in a radial direction, such that the distance of the edge 8 from a midpoint of the round shape is longer in the area of the extended portion 29 than the rest of the first mounting surface 5. In such an embodiment, the pivot point 10 may be provided within this extended portion 29.

In this disclosure, a surface contact refers to a contact between surfaces, where the contact has the form of a surface, rather than a point or a line. In other words, in such a surface contact, points of the opposing surfaces provided simultaneously in contact with each other at a given position of the tilting comprises at least three points that are spaced from each other in at least two dimensions, and preferably in three dimensions.

According to an embodiment, the pivot point 10 refers to the point, line or shape about which the mounting structure 1 is tilted with respect to second mounting surface 19. Depending on the embodiment, the pivot point 10 may or may not comprise a structure provided on the mounting structure 1.

In this disclosure, a cylindrical cavity refers to a cavity having a cylindrical shape provided in a structural part of the floating structure, such as the hull 4 or the propulsion unit 2 of the floating structure 3, which opens to a surface of the structural part at least at one end of the cylindrical cavity. Such a structural part may, thus, form the counterpart, in which the cylindrical cavity is formed. More particularly, the cylindrical cavity, such as a first cylindrical cavity 12, opens at least towards the surface of the structural part directed towards the mounting structure 1. Depending on an embodiment, a cylindrical cavity may, thus, be for instance a through-hole or a blind hole.

According to an embodiment, such as the embodiment of FIG. 2 or 4, the mounting surface 5 may be provided with at least two first protrusions 11. According to a further embodiment, the first mounting surface 5 is provided with at least three, preferably exactly three, first protrusions 11. The two, three or more first protrusions 11 may be spaced along an outer edge region of the first mounting surface 5. The outer edge region of the first mounting surface 5 refers to the region at which the first mounting surface is configured to engage with a second mounting surface 19 and to be mounted to the second mounting surface 19. According to an embodiment, the outer edge region is adjacent to the edge 8 of the first mounting surface 5. Preferably, the first protrusions are not, however, provided in the area of the extended portion 29. Depending on the embodiment, the first protrusions 11 may be provided at equal distances or at different distances from each other.

According to an embodiment, the first protrusions 11 are provided within the sealed portion 6. According to another embodiment, the first protrusions 11 are provided outside the sealed portion 6. According to a further embodiment, the first protrusions 11 are provided outside the sealed portion 6 and each first protrusion 11 is provided with a separate sealing for sealing the first protrusion 11 when the propulsion unit 2 is sealed to the hull 4.

According to an embodiment, the mounting structure 1 comprises an outer sealing groove 20 for receiving a seal 21. Such seals used for this type of purposes are known in the art and are not discussed here in more detail. The outer sealing groove 20 preferably has a closed shape. In other words, the outer sealing groove 20 preferably forms a continuous path without a start or an end on the first mounting surface 5. Such a closed or continuous shape of the outer sealing groove 20 may comprise for instance an annular, rectangular or an irregular shape defining an area within the shape. Thereby, the outer sealing groove 20 may define an area, which may be the sealed portion 6, on the first mounting surface 5 extending inwards from an outer edge of the outer sealing groove 20. According to an embodiment, the pivot point 10 is provided at an edge 8 or in the vicinity of an edge 8 of the first mounting surface and outside the sealed portion 6.

According to further embodiments, further sealing grooves 20' may be provided on the first mounting surface 5 besides the outer sealing groove 20. According to an embodiment, further sealing grooves 20' may be provided inside the outer sealing groove 20, in other words inwards from the outer sealing groove 20 on the first mounting surface 5, such as in the FIGS. 11 and 12. According to an embodiment, further sealing grooves 20' may be provided as separate sealing grooves defining an area outside the outer sealing groove 20 and not enclosing the outer sealing groove 20 within the area, for instance surrounding the first protrusions 11 in embodiments, in which the first protrusions 11 are provided outside the sealed portion 6. According to an embodiment, further sealing grooves 20' may be provided both inside and outside the outer sealing groove 20.

According to an embodiment, the sealed portion 6 may comprise at least an outer sealing groove 20 for receiving a seal 21. In such an embodiment, the first protrusions 11 may be provided in the vicinity of the outer sealing groove 20, preferably inside, in other words inwards from, the outer sealing groove 20.

Figure 11:
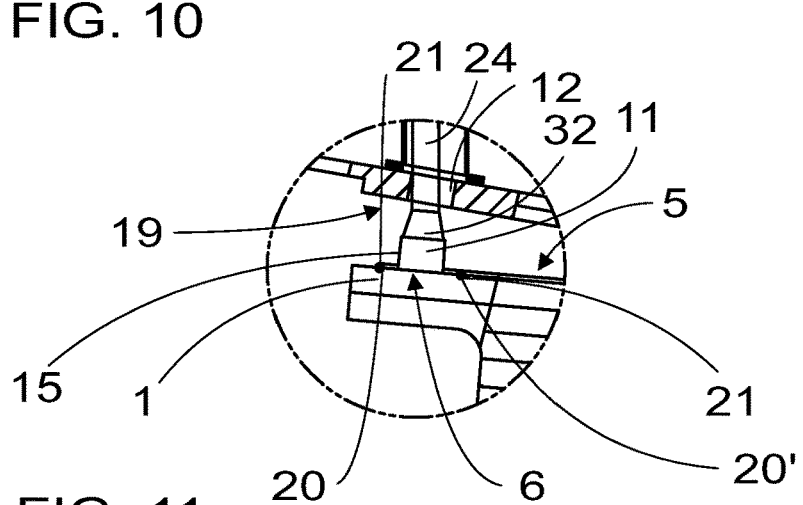
Figure 12:
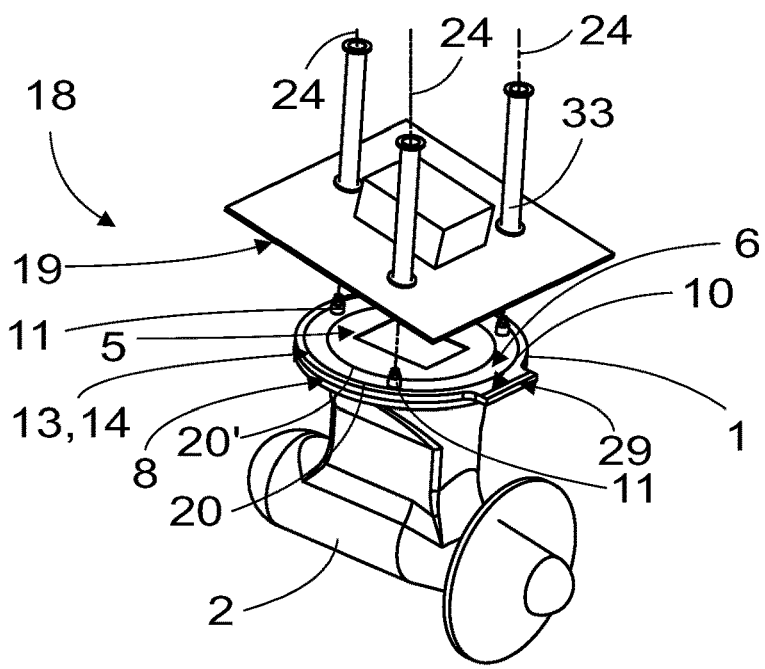
FIG. 12 illustrates a mounting arrangement seen in perspective.

According to an embodiment, the first mounting surface 5 may comprise two sealing grooves 20, 20' for receiving a seal 21, such as in the embodiments of FIGS. 11 and 12. In such an embodiment, the outer sealing groove 20 may define the sealed portion 6. According to an embodiment, the first mounting surface may comprise two seals 21 and the outer one of the seals 21 may, similarly to the sealing grooves 20, 20', define the sealed portion 6. According to an embodiment, first mounting surface 5 may comprise one seal 21 and/or one sealing groove, the outer sealing groove 20, and the sealed portion 6 may be defined inwards, in other words towards the midpoint of the round shape, from the seal 21 or the outer sealing groove 20.

According to an embodiment, wherein the first mounting surface 5 is provided with two seals 21 or sealing grooves 20, 20', the first protrusions 11 may be provided in an area between the seals 21 and/or the sealing grooves 20, 20'.

In other words, in some embodiments, the first protrusions 11 may be provided between the two sealing grooves 20, 20' and/or seals 21 or towards the midpoint of the round shape seen from the one sealing groove 20 and/or seal 21.

According to an embodiment, the pivot point 10 may be provided at an edge 8 or in the vicinity of an edge 8 of the first mounting surface and outside the sealed portion 6 defined by the two sealing grooves 20.

According to an embodiment, the seal(s) 21 is configured to seal the mounting flanges in a watertight manner. This enables removing the lifting members 24 and the installation tubes 33 from inside of the floating structure 3. This is particularly beneficial, when the mounting of the propulsion unit 2 is done under water.

Embodiments, where the first mounting surface 5 comprises at least one sealing groove 20, may be particularly beneficial in embodiments, where the mounting structure 1 configured to be provided in connection with the propulsion unit 2, either as an integral part of the propulsion unit 2 or as a separate structural part configured to be attached to the propulsion unit 2 with the first mounting surface 5 directed towards the hull 4. According to another embodiment, the sealed portion 6 may comprise a smooth area, against which the seal(s) 21 is provided, when the propulsion unit 2 is mounted to the hull 4. This kind of embodiments may be particularly beneficial in embodiments, where the mounting structure 1 is configured to be provided in connection with the hull 4 either as an integral part of or as configured to be attached to the hull 4 with the first mounting surface 5 directed towards the propulsion unit 2.

The first protrusions 11 may be arranged to guide the mutual position between the mounting structure 1 and the hull 4, when the propulsion unit 2 is moved, for instance by a mutual tilting of the parts, towards the hull 4. According to an embodiment, each of the first protrusions 11 comprises a curved surface 15 at least on a side of the first protrusion 11 facing away from the pivot point 10. The curved surface 15 may be curved at least in a direction 17 transverse to the first mounting surface 5. In other words, the curved surface 15 may be curved at least with respect to a direction perpendicular to a plane defined by the points of the outer edge of the first mounting surface 5. The curved surface 15 may also be curved in a plane defined by the points of the outer edge of the first mounting surface 5. According to an embodiment, the cross section of each first protrusion 11 in a plane defined by the points of the outer edge of the first mounting surface 5 is rounded in the area of the curved surface 15. In such an embodiment the curved surface is, thus, curved both in a plane defined by the points of the outer edge of the first mounting surface 5 and with respect to a direction perpendicular to this plane. However, when radius of curvature of the curved surface is discussed in this disclosure, it refers to the radius of curvature with respect to a direction perpendicular to a plane defined by the points of the outer edge of the first mounting surface 5, unless stated otherwise.

The curved surface 15 may, in each case, be curved in such a manner that the first protrusion 11 provided in a cylindrical cavity is configured to maintain a point contact, preferably a line contact and most preferably a surface contact with the cylindrical cavity, when the mounting structure 1 and, thus, the first protrusions 11 are tilted with respect to the cylindrical cavities about the pivot point 10. In other words, the contact maintained between the first protrusion 11 and the cylindrical cavity, when the first protrusion 11 and the cylindrical cavity are tilted with respect to each other, may preferably be a line contact or a surface contact, not a point contact.

According to an embodiment, the curved surface 15 is curved towards the pivot point 10 with respect to a direction perpendicular to a plane defined by the points of the outer edge of the first mounting surface 5 in order to maintain a point contact, a line contact or a surface contact with the cylindrical cavity. According to an embodiment, the counterpart comprises the hull 4, the cylindrical cavity is a first cylindrical cavity 12 provided in the hull 4, and the mounting structure 1 is provided in connection with the propulsion unit 2. According to another embodiment, the cylindrical cavity is a first cylindrical cavity 12 provided in the propulsion unit 2 and the mounting structure 1 is provided in connection with the hull 4. In either type of these embodiments, each first protrusion 11 may then be configured to be received in one of the first cylindrical cavities 12, in such a manner that the first protrusions guide the position of the propulsion unit 2 with respect to the hull 4, when the propulsion unit 2 is tilted with respect to the hull 4 about the pivot point 10.

According to an embodiment, each first protrusion 11 may further be configured to maintain a point contact, a line contact or a surface contact with the first cylindrical cavity 12 when the first protrusion 11 is provided at least partly inside the first cylindrical cavity 12 and when the propulsion unit 2 is tilted with respect to the hull 4 about the pivot point 10.

According to an embodiment, the first protrusions 11 may be formed of a metal material.

According to an embodiment, the first protrusions 11 may be, in addition to guiding the mutual position of the propulsion unit 2 and the hull 4, be configured to be used as lifting points. Such embodiments are shown for instance in FIGS. 5-8, 10 and 12. In an embodiment, where the mounting structure is provided in connection with the propulsion unit 2, lifting means, such as lifting member(s) 24 may then be attached to the first protrusions 11 for lifting the mounting structure 1 towards the hull 4.

According to an embodiment, each lifting member 24 may be provided with a guiding member 32 configured to be move in each case within one of the first cylindrical cavities 12 during the lifting and tilting of the propulsion unit 2 towards the hull 4 to guide the propulsion unit 2 to a position, where the first contact can take place. In other words, the guiding members 32 may be configured to guide the first mounting surface 5 and the second mounting surface 19 to such a mutual position that the first contact can take place at the pivot point 10. According to an embodiment, the guiding members 32 may be provided around the lifting members 24, in other words surrounding or enclosing lifting members 24. According to an embodiment, one of the guiding members 32, more particularly the guiding member 32 configured to be provided closest to the first protrusion 11, may comprise a conical shape. Preferably, a wider end of the conical guiding member 32 is provided towards the first protrusion 11, which further supports the guiding of the parts during lifting and tilting. According to an embodiment, the guiding members 32 may be made of a polymeric material, preferably a plastic material.

According to an embodiment, installation tubes 33 may be provided in connection with second mounting surface 19 and adjacent to each first cavity 12, and the lifting members 24, such as lifting wires, may be configured to extend inside the installation tubes 33. In other words, the lifting members 24 may be configured to be guided through the installation tubes and then connected to the first mounting surface 5 via the first protrusions 11, or other connecting means. The installation tubes 33 may, thus, be configured to further guide the mutual tilting of the parts, namely the first mounting surface 5 and the second mounting surface 19.

According to an embodiment, the first mounting surface 5 may comprise a first mounting flange 13 comprising a planar surface 14 configured to engage with a second mounting surface 19. More particularly, the planar surface 14 may extend at least in the area of the sealed portion 6. The first mounting flange 13 may comprise a flange-like part or structure configured to engage, directly or indirectly, with the second mounting surface 19. The second mounting surface 19 may comprise a second mounting flange comprising a second planar surface 14' to be placed against the planar surface 14 in the mounting structure 1, when the propulsion unit 2 is mounted to the hull 4. According to an embodiment, the mounting structure is configured to be provided in connection with the propulsion unit 2 and the hull 4 comprises the second mounting surface 19. According to another embodiment, the mounting structure is configured to be provided in connection with the hull 4 and the propulsion unit 2 comprises the second mounting surface 19.

The pivot point 10 refers to an edge, about which the propulsion unit 2 is tilted with respect to the hull 4 of the floating structure 3, when the propulsion unit 2 is mounted to the hull 4 as described in this disclosure. According to an embodiment, the pivot point 10 may be formed between the edge 8 of the first mounting surface 5 and the sealed portion 6.

According to an embodiment, each one of curved surfaces 15, 15 of the first protrusions 11 has a radius of curvature of the curved surface that is dependent on the distance 16 of the curved surface 15 from the pivot point 10. In such embodiments, surface 15 is, thus, formed at least in a direction 17 perpendicular to the first mounting surface in a manner dependent of a distance 16 between the pivot point 10 and the surface 15 by having a radius of curvature of the curved surface that is dependent on the distance of the curved surface 15 from the pivot point 10. According to an embodiment, a radius of curvature of each of the curved surfaces 15, 15 is substantially equal to the distance of the curved surface 15, 15 from the pivot point 10. Substantially equal refers to the radius of curvature being within a tolerance from the distance, wherein the tolerance comprises a manufacturing tolerance and a fitting accuracy.

According to an embodiment the sealed portion 6 may be provided with mounting openings 22 for mounting members 23 for mounting the propulsion unit 2 to the hull 4 via the mounting structure 1. A detail of such an embodiment in shown in FIG. 15. Mounting the propulsion unit 2 to the hull 4 via the mounting structure 1 refers to the mounting structure 1 being configured to be provided in connection with either the propulsion unit 2 or the hull 4 and the first mounting surface 5 forming one of the mounting surfaces at which the propulsion unit 2 is mounted to the hull 4. According to an embodiment, mounting openings 22 may comprise holes, such as through-holes and/or blind-holes. According to an embodiment, the mounting members 23 may comprise bolts or other known type of mounting members.

According to an embodiment, the mounting structure 1 is formed as a separate structural part. Such a mounting structure 1 may be configured to be provided in connection with the propulsion unit 2 or the hull 4 by being mounted to the propulsion unit 2 or the hull, respectively, by any suitable mounting method, such as by bolts or by welding. According to another embodiments, the mounting structure 1 is formed as an integral part of the propulsion unit 2 or the hull 4. In other words, the mounting structure 1 may also be configured to be provided in connection with the propulsion unit 2 or the hull 4 by being formed as an integral part of the propulsion unit 2 or the hull, respectively.

According to an embodiment, the mounting structure 1 is configured to be provided in connection with the propulsion unit 2, and the first mounting surface 5 is configured to be directed towards the hull 4 of the floating structure 3, when the propulsion unit 2 is mounted to the hull 4 and, thus, the floating structure 3. According to another embodiment, the mounting structure 1 is configured to be provided in connection with the hull 4, and the first mounting surface 5 is configured to be directed towards the propulsion unit 2, when the propulsion unit 2 is mounted to the hull 4 and, thus, the floating structure 3.

According to an embodiment, a propulsion unit 2 may comprise a mounting structure 1 according to an embodiment or a combination of embodiments described in this disclosure. According to an alternative embodiment, a hull 4 may comprise a mounting structure 1 according to an embodiment or a combination of embodiments described in this disclosure.

Figure 3:
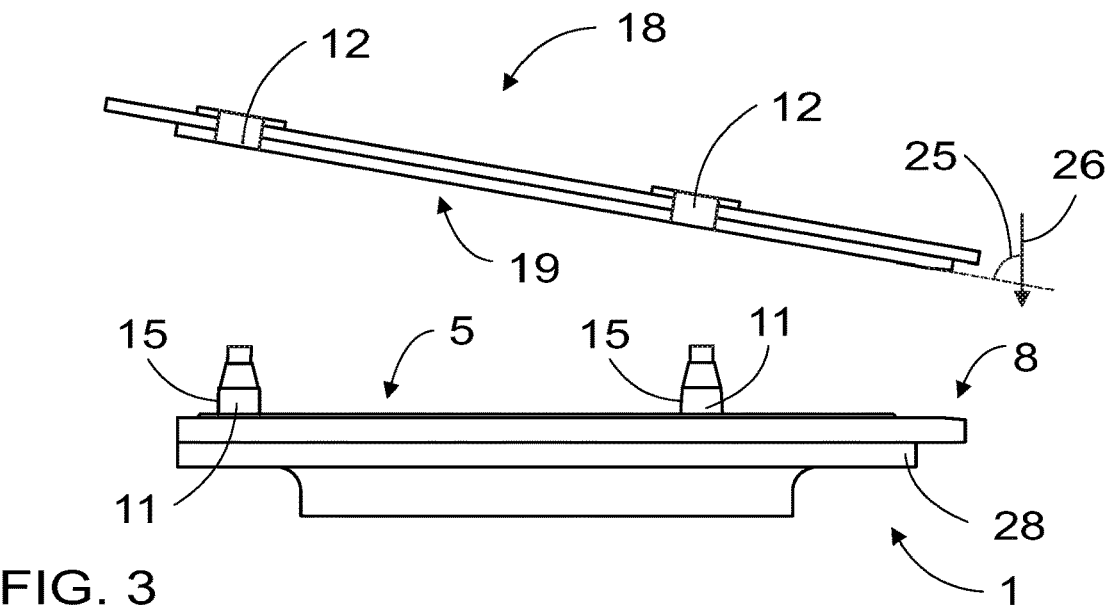
FIG. 3 illustrates a mounting arrangement for mounting a propulsion unit to a hull of a floating structure.

FIG. 3 illustrates a mounting arrangement 18 for mounting a propulsion unit 2 to a hull 4 of a floating structure 3.

A mounting arrangement 18, such as a mounting arrangement of FIG. 3, may comprise a mounting structure 1 according to an embodiment or a combination of embodiments described in this disclosure.

A mounting arrangement 18 may further comprise a second mounting surface 19 and at least one seal 21 provided in the sealed portion 6 of the mounting structure 1 for sealing the propulsion unit 2 to the hull 4. One of the first mounting surface 5 and the second mounting surface 19 may then be configured to be provided in connection with the hull 4 of the floating structure 3, and the other of the first mounting surface 5 and the second mounting surface 19 is configured to be provided in connection with the propulsion unit 2. In other words, the mounting structure 1 comprising the first mounting surface 5 may be configured to be provided in connection with either the propulsion unit 2 or the hull 4, and the second mounting surface 19 is then provided with either the hull 4 or the propulsion unit 2, respectively. More particularly, the mounting structure 1 being configured to be provided in connection with the propulsion unit 2 or the hull 4 refers to the mounting structure being either formed as an integral part or mounted to the propulsion unit 2 or hull 4, as described in more detail in connection with the mounting structure embodiments.

According to an embodiment, the mounting surface, namely the first mounting surface 5 or the second mounting surface 19, provided in connection with the hull 4 may be arranged at an angle 25 in at least one direction with respect to the direction of an acceleration due to gravity vector 26.

The second mounting surface 19 may be arranged at an angle 25 in at least one direction with respect to the direction of an acceleration due to gravity vector 26. In other words, the second mounting surface 19 may be arranged at an angle 25 for instance in a longitudinal direction or in a transverse direction of the floating structure 3. The longitudinal direction of the floating structure refers to a direction parallel to a main direction of movement of a marine vehicle, and in case of another type of a floating structure direction of the longest horizontal dimension of the floating structure, when the floating structure 3 is in its typical use position. Similarly, a transverse direction refers to a direction perpendicular to both the longitudinal direction and to the direction of the acceleration due to gravity vector 26. According to another embodiment, the second mounting surface 19 may be arranged at an angle 25 in two directions (the second direction not shown in figures) with respect to the direction of an acceleration due to gravity vector 26. According to an embodiment, one or both of the angles 25 may be in the range of 82 to 89 degrees. According to a further embodiment, each angle 25 is in the range of 82 to 89 degrees. However, the mounting structure 1, mounting arrangement 18, propulsion unit 2, and method described in this description and accompanying claims and drawings is not limited to these angles, but are useful in connection other values of the angle 25 as well. For instance, according to an embodiment, one or both of the angles 25 comprise an acute angle. According to a further embodiment, one or both of the angles 25 may be smaller than or equal to 89 degrees. According to a further embodiment, one or both of the angles 25 may be in the range of 75 to 89 degrees.

According to an embodiment, the mounting structure may be configured to be provided in connection with the propulsion unit 2, and a side of the second mounting surface 19 lower in the use position of the hull 4 may be configured to be brought into contact with the pivot point 10, when the mounting structure is tilted with respect to the hull about the pivot point 10. The use position of the hull 4 refers to a typical position of the hull 4 during typical use of the floating structure 3 in or on water. According to an embodiment, the mounting structure may be configured to be provided in connection with the hull, and a side of the second mounting surface 19 upper in the lifting position of the propulsion unit 2 may be provided with a first cylindrical cavity 12 for receiving a first protrusion 11. The lifting position here refers to the position of the propulsion unit 2, when it is being lifted towards the hull 4, but there is no contact between the propulsion unit 2 and the hull 4 and the tilting of the propulsion unit 2 with respect to the hull 4 has not yet started.

A mounting arrangement 18 may further comprise a hull 4 and/or the propulsion unit 2. The hull 4 or the propulsion unit 2 of the floating structure may then comprise the second mounting surface 19 as described in the above embodiments.

According to an embodiment, at least one seal 21 provided in the sealed portion 6 of the mounting structure 1 for sealing the propulsion unit 2 to the hull 4. Different embodiments of sealing the propulsion unit 2 to the hull 4 are described in connection with the mounting structure embodiments.

According to an embodiment, the second mounting surface 19 further comprises at least two first cylindrical cavities 12 for receiving in each case one of the first protrusions 11. According to another embodiment each of the first protrusions 11 is configured to be received in one of the first cylindrical cavities 12 in such a manner that the first protrusions guide the position of the propulsion unit 2 with respect to the hull, when the propulsion unit 2 is tilted with respect to the hull 4 about the pivot point 10.

According to a further embodiment, each one of curved surfaces 15 of the first protrusions 11 has a radius of curvature of the curved surface that is dependent on the distance of the curved surface 15 from the pivot point 10. Each radius of curvature may be similar to one of those described in connection with the mounting structure embodiments or a combination thereof.

According to an embodiment, the first protrusions 11 may also be configured to be used as lifting points and the first cylindrical cavities 12 may be formed as through-holes. This may be particularly useful in embodiments, where the mounting structure 1 is configured to be provided in connection with the propulsion unit 2. Thereby, in such an embodiment, lifting member(s) 24 may be arranged to extend through the first cylindrical cavities 12 and to be connected to the first protrusions 11 in such a manner that when the mounting structure 1 is lifted towards the hull 4 from below the hull 4 in a direction opposite to the direction of the acceleration due to gravity vector 26 by the lifting member(s) 24. The first mounting surface 5 may take a substantially horizontal position when being lifted towards the hull 4. The first contact between the mounting structure 1 and the hull 4 may take place at a first point of contact 27 at the side provided with the pivot point 10. The first point of contact 27 is preferably provided outside the sealed portion 6. The first point of contact 27 may comprise a point-like or a line-like shape, or some other shape. The direction opposite to the direction of the acceleration due to gravity vector 26 refers to a direction parallel, but opposite to the direction of the acceleration due to gravity vector, in other words an upwards vertical direction.

In such an embodiment, when the lifting is continued after the first contact, the first protrusions 11 are tilted in each case inside a respective first cylindrical cavity 12 about the pivot point 10. Thereby the mounting structure 1 is guided by the first protrusions 11 and tilted towards the second mounting surface 19, until the first mounting surface 5 and the second mounting surface 19 are brought into positions parallel to one another and sealed to one another by the at least one seal 21.

Although the figures show the mounting structure 1 and the first mounting surface 5 being provided in connection with the propulsion unit 2, in embodiments, where the mounting structure 1 is configured to be provided in connection with the hull 4, the tilting of the propulsion unit 2 with respect to the hull 4 may take place in a similar manner, but the first cylindrical cavities 12 are provided in the propulsion unit 2. In other words, the guiding structures, namely the first protrusions 11 and the first cylindrical cavities 12 change sides, but the lifting, tilting and guiding principle remains otherwise the same.

According to an embodiment, a floating structure 3 may comprise at least one of the following: a mounting structure 1 according to an embodiment or a combination of embodiments described in this disclosure, a propulsion unit 2 described in this disclosure, or a mounting arrangement 18 according to an embodiment or a combination of embodiments described in this disclosure.

Figure 9:
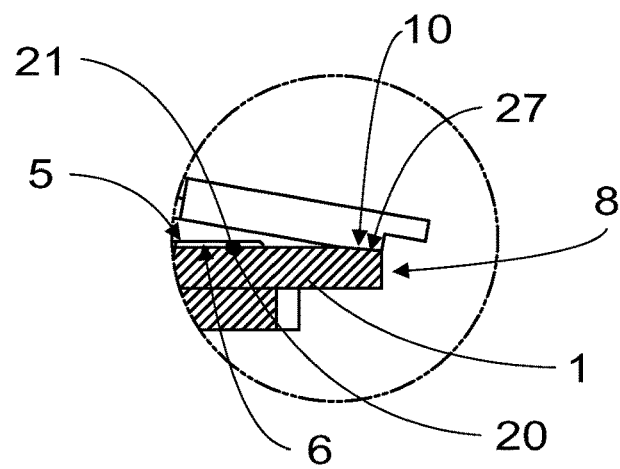
FIGS. 9-11 illustrate details of mounting arrangements for mounting a propulsion unit to a hull of a floating structure.
Figure 10:
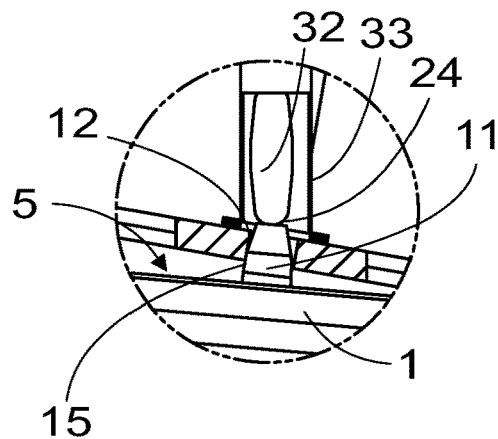
Figure 13:
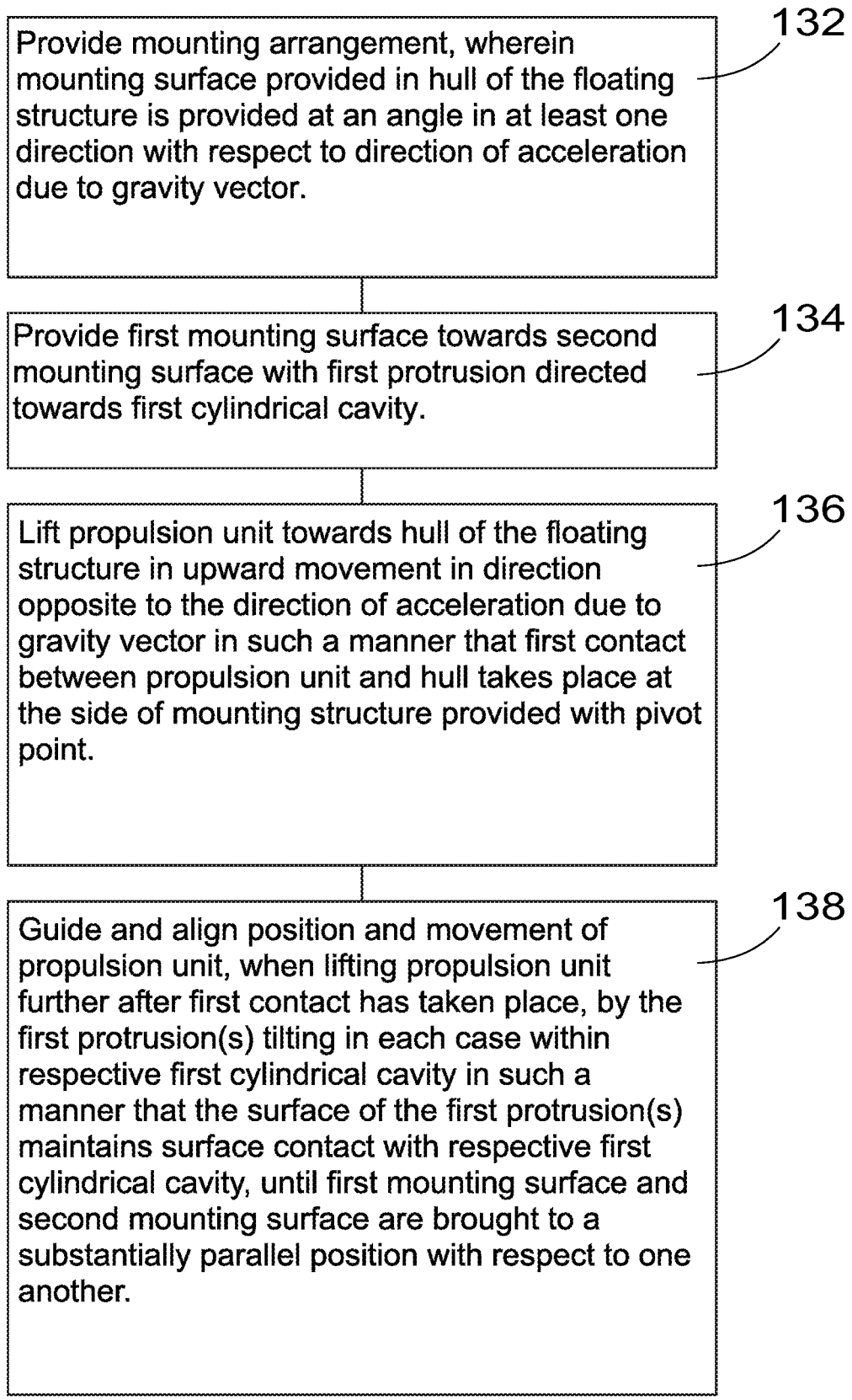
FIG. 13 illustrates a method for mounting a propulsion unit to a floating structure.
Figure 14:
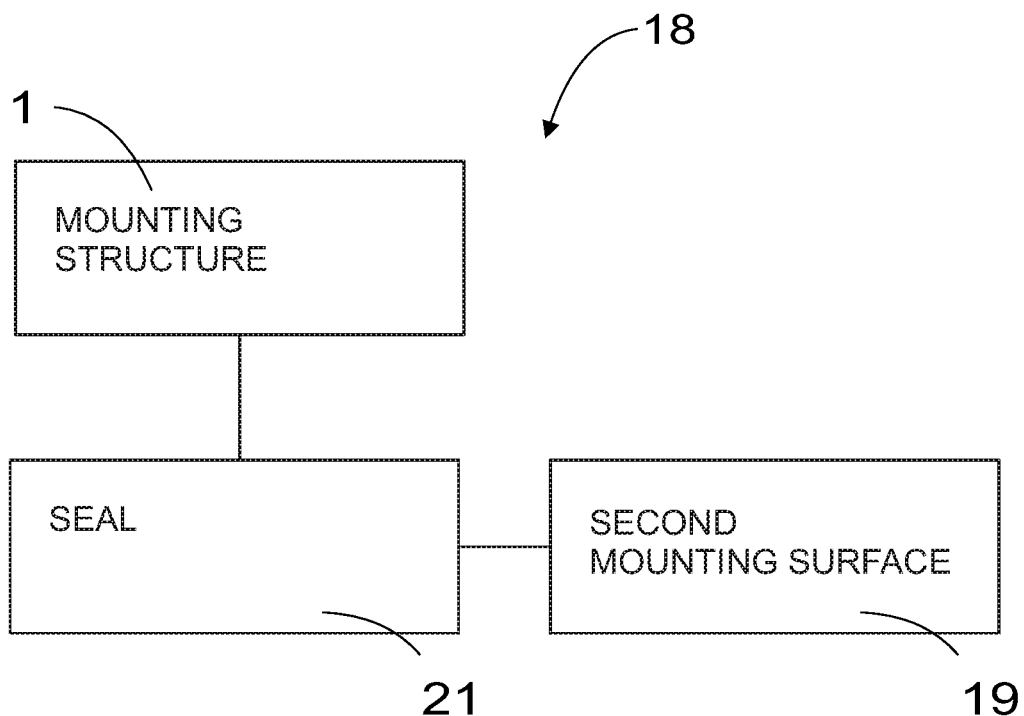
FIG. 14 illustrates a mounting arrangement for mounting a propulsion unit to a hull of a floating structure schematically.

FIG. 13 illustrates a method for mounting a propulsion unit 2 to a floating structure 3. In such a floating structure 3, a second mounting surface 19 may be provided in a hull 4 or a propulsion unit 2 of the floating structure 3, as described in this disclosure. FIGS. 5-8 illustrate different phases and positions of mounting a propulsion unit 2 to a floating structure 3 according to an embodiment seen from a side and partly transparently, and FIGS. 9-11 illustrate details of mounting arrangements 18 for mounting a propulsion unit 2 to a hull 4 of a floating structure 3. Reference D in FIG. 5 refers to the part of the mounting arrangement 18, the embodiments of which are shown in more detail in FIGS. 2 and 4.

A method according to the embodiment of FIG. 13 comprises 132 providing a mounting arrangement 18 described in this disclosure, wherein the mounting surface 5, 19 provided in the hull 4 of the floating structure 3 is provided at an angle 25 in at least one direction with respect to the direction of an acceleration due to gravity vector 26.

The method further comprises providing 134 the first mounting surface 5 towards the second mounting surface 19 with the first protrusion 11 directed towards the first cylindrical cavity 12; and lifting 136 the propulsion unit 2 towards the hull 4 of the floating structure 3 in an upward movement in a direction opposite to the direction of the acceleration due to gravity vector. In other words, the propulsion unit 2 is provided under the hull 4 and lifted upwards towards the hull 4. The first mounting surface 5 of the mounting structure 1 according to an embodiment or a combination of embodiments described in this disclosure is, thus, directed towards the propulsion unit 2 or the hull 4 provided with the first cylindrical cavity 12, depending on whether the mounting structure 1 is provided in connection with the hull 4, or the propulsion unit 2.

The upward movement is carried out in such a manner that a first contact between the propulsion unit 2 and the hull 4 takes places at the side of the mounting structure 1 provided with the pivot point 10. In other words, if the mounting structure 1 is provided in connection with the propulsion unit 2, the first contact between the propulsion unit 2 and the hull 4 takes place between the first mounting surface 5 and the bottom surface of the hull 4 at the side of the pivot point 10. Similarly, if the mounting structure 1 is provided in connection with the hull 4, the first contact between the propulsion unit 2 and the hull 4 takes place between the first mounting surface 5 and the upper surface of the propulsion unit 2 at the side of the pivot point 10.

The method further comprises guiding and aligning 138 the position and the movement of the propulsion unit 2, when lifting the propulsion unit 2 further after the first contact has taken place, by the first protrusion(s) 11 tilting in each case within a respective first cylindrical cavity 12 in such a manner that the curved surface 15 of the first protrusion(s) maintains a surface contact with the respective first cylindrical cavity 12, until the first mounting surface 5 and a second mounting surface 19 are brought to a substantially parallel position with respect to one another. In other words, the first protrusion(s) 11 and the first cylindrical cavities act as guiding structures guiding the propulsion unit 2 and the hull 4 to the intended position with respect to each other, when the propulsion unit 2 is simultaneously tilting about the pivot point 10 with respect to the hull 4.

According to an embodiment, the first mounting surface 5 may comprise at least two first protrusions 11, and the second mounting surface 19 may comprise at least two first cylindrical cavities 12 for receiving in each case one of the first protrusions 11. Each of the first protrusions 11 may then be configured to be received in one of the first cylindrical cavities 12 in such a manner that the first protrusions guide the position of the propulsion unit with respect to the hull, when the propulsion unit is tilted with respect to the hull about the pivot point 10. More particularly, the first protrusions 11 are in each case tilted inside a respective first cylindrical cavity 12 in such a manner that the curved surface 15 of each first protrusion 11 maintains a surface contact with the respective first cylindrical cavity 12 until the first mounting surface 5 and the second mounting surface 19 are brought to a substantially parallel position with respect to one another. In such embodiments, thus, the first protrusion(s) 11 and the first cylindrical cavities 12 act as guiding structures guiding the propulsion unit 2 with respect to the hull 4, when the propulsion unit 2 is lifted towards the hull 4.

According to an embodiment, each one of curved surfaces 15, 15 of the first protrusions 11 has a radius of curvature of the curved surface that is dependent on the distance of the curved surface 15, 15 from the pivot point 10. This improves the surface contact between the respective protrusions and cavities and, thus, the guiding of the mutual position between the propulsion unit 2 and the hull 4, when the propulsion unit 2 is lifted towards and tilted with respect to the hull 4. According to an embodiment, such a radius of curvature may be similar to those described in connection with the mounting structure embodiments.

According to an embodiment, the first mounting surface 5 may be arranged in connection with the propulsion unit 2 and the second mounting surface 19 may be arranged in connection with the hull 4. In such an embodiment, the first protrusions 11 may also be configured to be used as lifting points. The first cylindrical cavities 12 may then be formed as through-holes. Thereby, the method may further comprise the steps of arranging lifting member(s) 24 to extend through the first cylindrical cavities 12; connecting the lifting member(s) 24 to the first protrusions 11; and guiding, when the lifting is continued after the first contact and the first protrusions 11 are received in the second cavities 12, the position and the movement of the mounting structure 1 by the first protrusions 11 tilting in each case inside a respective first cylindrical cavity 12 about the pivot point 10. This guiding may be carried out in such a manner that the curved surface 15 of each first protrusion maintains a surface contact with the respective first cylindrical cavity 12 until the first mounting surface 5 and the second mounting surface 19 are brought to a substantially parallel position with respect to one another.

According to an embodiment, in a method according to an embodiment or a combination of embodiments described in this disclosure, the hull 4 is provided in water during the mounting of the propulsion unit 2 to the hull 4, and the mounting of the propulsion unit 2 to the hull 4 takes place under the water.

According to an embodiment, the second mounting surface 19 is provided with mounting openings 22' corresponding to the mounting openings 22 in the first mounting surface 5. Thereby, when the first mounting surface 5 and the second mounting surface 19 are brought to a substantially parallel position with respect to one another, the propulsion unit 2 may be mounted to the hull 4 of the floating structure 3 by providing mounting members 23, such as bolts, through the mounting openings 22, 22' and fastening the mounting members 23 to their positions. A detail of such an embodiment in shown in FIG. 15.

Figure 15:
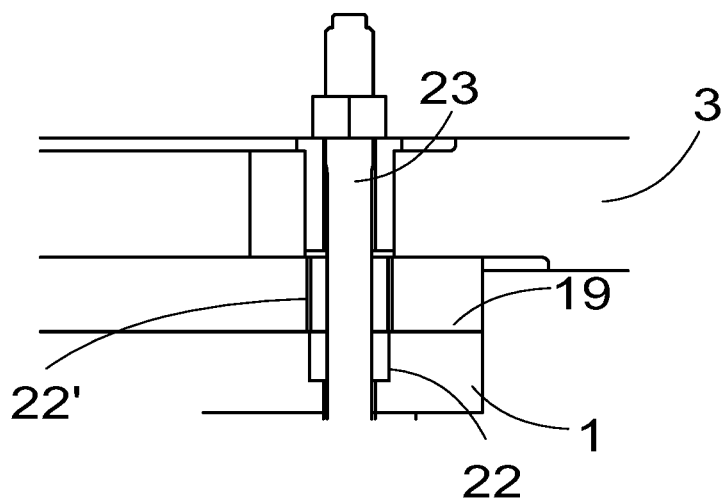
FIG. 15 illustrates a detail of a mounting arrangement according to an embodiment in cross section seen from a side.

According to an embodiment, the mounting openings 22 of the first mounting surface 5 may be provided in the sealed portion 6. According to an embodiment, the first mounting surface 5 may be provided with at least two sealing grooves 20, 20' and/or seals 21, and the mounting openings 22 may be provided between two adjacent sealing grooves 20, 20' and/or seals 21, such as in the embodiments of FIGS. 11 and 12. Providing the mounting openings 22 within the sealed portion 6, in other words inwards from the outer sealing groove 20 and/or the outermost seal 21, enables mounting the propulsion unit 2 to the hull 4 by mounting members 23 inside a sealed space. This, on the other hand, enables mounting the mounting members 23 from inside the floating structure 3. A detail of an example of such an embodiment is shown FIG. 15. In the embodiment of FIG. 15, the mounting opening 22' of the second mounting surface 19 may be a regular through-hole, the mounting opening 22 of the first mounting surface 5 may be threaded at least at the end opposite to the second mounting surface 19, and, similarly, the mounting member 23 provided through the mounting openings 22, 22' may be provided with a corresponding threading at least at the end directed towards the first mounting surface 5, which further contributes to mounting the mounting members 23 from inside of the floating structure 3. In the embodiment of FIG. 15, the mounting members 23 may, in connection with each mounting opening 22, comprise a dowel, a washer, a sleeve and a nut.

According to an embodiment, the first protrusions 11 and the cylindrical cavities 12 are positioned on the first mounting surface 5 and the second mounting surface 19, respectively, and the surface 15 of each first protrusion 11 is formed to guide the mutual tilting movement of the cylindrical cavities 12 and the first protrusions 11 and/or to align the first mounting surface 5 and the second mounting surface 19, when the mounting structure 1 and, thus, the first protrusions 11 are tilted with respect to the cylindrical cavities 12 about the pivot point 10. More particularly, the first protrusions 11 and the cylindrical cavities 12 may be configured, in the manner described, to align at least some of the mounting openings 22 in the first mounting surface 5 with at least some of the mounting openings 21' in the second mounting surface 19.

According to an embodiment, the propulsion unit 2 and the hull 4 are further sealed to one another by the at least one seal 21. According to an embodiment, the seal 21 may be provided in at least one sealing groove, such as the outer sealing groove 20 or a further sealing groove 20", provided in the mounting structure 1, the propulsion unit 2 or the hull 4. More particularly, the at least one sealing groove 20, 20' may be provided on the first mounting surface 5 or the second mounting surface 19. Preferably, the at least one seal 21 is provided on the propulsion unit 2 side, in other words on an upper surface of the propulsion unit 2 or on the first mounting surface 5 of a mounting structure 1 provided in connection with the propulsion unit 2.

An advantage of the embodiments described above is that a first contact between the seal 21 and the mounting surface 5, 19 provided in the hull 4 may be configured to take place at the very last point before the first mounting surface 5 and the second mounting surface 19 are brought into a final, mutually parallel position. Thereby, neither the first or the second mounting surface 5, 19 does cut into the seal during the lifting and mounting of the propulsion unit 2. This minimizes the risk of damaging the seal 21 during the mounting.

The invention claimed is:

1. A mounting structure for mounting a propulsion unit to a hull of a floating structure, the mounting structure comprising:
  a first mounting surface, and
  a sealed portion provided on the first mounting surface for sealing the propulsion unit to the hull,
  wherein the first mounting surface is further provided with:
    a pivot point provided at an edge or in the vicinity of an edge of the first mounting surface and outside the sealed portion, and
    at least two first protrusions spaced from each other on the first mounting surface, wherein each of the first protrusions includes a surface at least on a side of the first protrusion facing away from the pivot point, said surface is formed at least in a direction perpendicular to the first mounting surface dependent of a distance between the pivot point and the surface such that the first protrusion provided in a cylindrical cavity formed in a counterpart is configured to guide a mutual tilting movement of the cylindrical cavity and the first protrusion, when the mounting structure and, thus, the first protrusions are tilted with respect to the cylindrical cavities about the pivot point.

2. The mounting structure according to claim 1, wherein the surface comprises a curved surface, and wherein the curved surface is curved at least in a direction perpendicular to the first mounting surface such that the first protrusion provided in the cylindrical cavity formed in the counterpart is configured to maintain a contact with the cylindrical cavity, when the mounting structure and, thus, the first protrusions are tilted with respect to the cylindrical cavities about the pivot point.

3. The mounting structure according to claim 1, wherein the first mounting surface is provided with at least three first protrusions.

4. The mounting structure according to claim 2, wherein each one of curved surfaces of the first protrusions has a radius of curvature of the curved surface that is dependent on the distance between the pivot point and the surface.

5. The mounting structure according to claim 1, wherein the mounting structure comprises an outer sealing groove for receiving a seal, the outer sealing groove having a closed shape and defining an area, the sealed portion, on the first mounting surface extending inwards from the outer sealing groove, and wherein the pivot point is provided at an edge or in the vicinity of an edge of the first mounting surface and outside the sealed portion.

6. The mounting structure according to claim 1, wherein the mounting structure is formed as an integral part of a hull, as an integral part of the propulsion unit, or as a separate structural part.

7. The mounting structure according to claim 1, wherein the first protrusions are also configured to be used as lifting points.

8. A propulsion unit, comprising a mounting structure, which includes:
  a first mounting surface, and
  a sealed portion provided on the first mounting surface for sealing the propulsion unit to a hull,
  wherein the first mounting surface is further provided with:
    a pivot point provided at an edge or in the vicinity of an edge of the first mounting surface and outside the sealed portion, and
    at least two first protrusions spaced from each other on the first mounting surface, wherein each of the first protrusions includes a surface at least on a side of the first protrusion facing away from the pivot point, said surface is formed at least in a direction perpendicular to the first mounting surface dependent of a distance between the pivot point and the surface such that the first protrusion provided in a cylindrical cavity formed in a counterpart is configured to guide a mutual tilting movement of the cylindrical cavity and the first protrusion, when the mounting structure and, thus, the first protrusions are tilted with respect to the cylindrical cavities about the pivot point.

9. A mounting arrangement for mounting a propulsion unit to a hull of a floating structure, comprising:
  a mounting structure having:
    a first mounting surface, and
    a sealed portion provided on the first mounting surface for sealing the propulsion unit to the hull,
    wherein the first mounting surface is further provided with:

a pivot point provided at an edge or in the vicinity of an edge of the first mounting surface and outside the sealed portion, and at least two first protrusions spaced from each other on the first mounting surface, wherein each of the first protrusions includes a surface at least on a side of the first protrusion facing away from the pivot point, said surface is formed at least in a direction perpendicular to the first mounting surface dependent of a distance between the pivot point and the surface such that the first protrusion provided in a cylindrical cavity formed in a counterpart is configured to guide a mutual tilting movement of the cylindrical cavity and the first protrusion, when the mounting structure and, thus, the first protrusions are tilted with respect to the cylindrical cavities about the pivot point;

a second mounting surface; and at least one seal provided in the sealed portion of the mounting structure for sealing the propulsion unit to the hull;

wherein one of the first mounting surface and the second mounting surface is configured to be arranged in connection with the hull of the floating structure, and the other of the first mounting surface and the second mounting surface is configured to be arranged in connection with the propulsion unit.

10. The mounting arrangement according to claim 9, wherein the mounting surface arranged in connection with the hull is arranged at an angle in at least one direction with respect to the direction of an acceleration due to gravity vector.

11. The mounting arrangement according to claim 9, wherein the second mounting surface further comprises at least two first cylindrical cavities for receiving in each case one of the first protrusions.

12. The mounting arrangement according to claim 11, wherein each of the first protrusions is configured to be received in one of the first cylindrical cavities such that the first protrusions guide the position of the propulsion unit with respect to the hull, when the propulsion unit is tilted with respect to the hull about the pivot point.

13. The mounting arrangement according to claim 9, wherein
the first mounting surface is provided in connection with the propulsion unit and the second mounting surface is provided in connection with the hull.

14. The mounting arrangement according to claim 13, wherein
a side of the second mounting surface lower in the use position of the hull is configured to be brought into contact with the pivot point, when the mounting structure is tilted with respect to the hull about the pivot point.

15. The mounting arrangement according to claim 13, wherein the first protrusions are also configured to be used as lifting points, and wherein the first cylindrical cavities are formed as through-holes, whereby lifting member(s) may be arranged to extend through the first cylindrical cavities and to be connected to the first protrusions in such a manner that when the mounting structure is lifted towards the hull from below the hull in a direction opposite to the direction of the acceleration due to gravity vector by the lifting member(s), the first mounting surface takes a substantially horizontal position when being lifted towards the hull, the first contact between the mounting structure and the hull takes place at a first point of contact at the side provided with the pivot point, and when the lifting is continued after the first contact, the first protrusions are tilted in each case inside a respective first cylindrical cavity about the pivot point, whereby the mounting structure is guided by the first protrusions and tilted towards the second mounting surface, until the first mounting surface and the second mounting surface are brought into positions parallel to one another and sealed to one another by the at least one seal.

16. The mounting arrangement according to claim 15, wherein each lifting member is provided with a guiding member configured to be move in each case within one of the first cylindrical cavities during the lifting and tilting of the propulsion unit towards the hull to guide the propulsion unit to a position, where the first contact can take place.

17. A floating structure, comprising at least one of the following: a mounting structure, a propulsion unit, or a mounting arrangement;

wherein the mounting structure includes:
a first mounting surface, and
a sealed portion provided on the first mounting surface for sealing the propulsion unit to a hull of a floating structure,
wherein the first mounting surface is further provided with:
a pivot point provided at an edge or in the vicinity of an edge of the first mounting surface and outside the sealed portion, and
at least two first protrusions spaced from each other on the first mounting surface, wherein each of the first protrusions includes a surface at least on a side of the first protrusion facing away from the pivot point, said surface is formed at least in a direction perpendicular to the first mounting surface dependent of a distance between the pivot point and the surface such that the first protrusion provided in a cylindrical cavity formed in a counterpart is configured to guide a mutual tilting movement of the cylindrical cavity and the first protrusion, when the mounting structure and, thus, the first protrusions are tilted with respect to the cylindrical cavities about the pivot point,
wherein the propulsion unit includes the mounting structure, and
wherein the mounting arrangement mounts the propulsion unit to the hull of the floating structure.

18. A method for mounting a propulsion unit to a floating structure, the method comprises the steps of:

providing a mounting arrangement having:
a mounting structure having:
a first mounting surface, and
a sealed portion provided on the first mounting surface for sealing the propulsion unit to a hull of the floating structure,
wherein the first mounting surface is further provided with:
a pivot point provided at an edge or in the vicinity of an edge of the first mounting surface and outside the sealed portion, and
at least two first protrusions spaced from each other on the first mounting surface, wherein each of the first protrusions includes a surface at least on a side of the first protrusion facing away from the pivot point, said surface is formed at least in a direction perpendicular to the first mounting surface dependent of a distance between the pivot point and the surface such that the first protrusion provided in a cylindrical cavity formed in a counterpart is configured to guide a mutual tilting movement of the cylindrical cavity and the first protrusion, when the mounting structure and, thus, the first protrusions are tilted with respect to the cylindrical cavities about the pivot point;

a second mounting surface;

at least one seal provided in the sealed portion of the mounting structure for sealing the propulsion unit to the hull;

wherein one of the first mounting surface and the second mounting surface is configured to be arranged in connection with the hull of the floating structure, and the other of the first mounting surface and the second mounting surface is configured to be arranged in connection with the propulsion unit, wherein one of the first mounting surface and the second mounting surface is provided at an angle in at least one direction with respect to the direction of an acceleration due to gravity vector;

providing the first mounting surface towards the second mounting surface with the first protrusion directed towards the first cylindrical cavity;

lifting a propulsion unit towards the hull of the floating structure in an upward movement in a direction opposite to the direction of the acceleration due to gravity vector in such a manner that a first contact between the propulsion unit and the hull takes places at the side of the mounting structure provided with the pivot point;

guiding and aligning the position and the movement of the propulsion unit, when lifting the propulsion unit further after the first contact has taken place, by the first protrusions tilting in each case within a respective first cylindrical cavity in such a manner that the surface of the first protrusion(s) maintains a surface contact with the respective first cylindrical cavity, until the first mounting surface and the second mounting surface are brought to a substantially parallel position with respect to one another.

19. The method according to claim 18, wherein the first mounting surface is arranged in connection with the propulsion unit and the second mounting surface is arranged in connection with the hull, and wherein the first protrusions are also configured to be used as lifting points, and wherein the first cylindrical cavities are formed as through-holes, and wherein the method further comprises the steps of:

arranging lifting member(s) to extend through the first cylindrical cavities;

connecting the lifting member(s) to the first protrusions, and guiding, when the lifting is continued after the first contact and the first protrusions are received in the second cavities, the position and the movement of the mounting structure, by the first protrusions tilting in each case inside a respective first cylindrical cavity about the pivot point in such a manner that the surface of each first protrusion maintains a contact with the respective first cylindrical cavity until the first mounting surface and the second mounting surface are brought to a substantially parallel position with respect to one another.

20. The method according to claim 18, wherein the hull is provided in water during the mounting of the propulsion unit to the hull, and wherein the method comprises mounting of the propulsion unit to the hull under the water.

\* \* \* \* \*

UNITED STATES PATENT AND TRADEMARK OFFICE
CERTIFICATE OF CORRECTION

| | | |
|---|---|---|
| PATENT NO. | : 12,263,930 B2 | Page 1 of 1 |
| APPLICATION NO. | : 18/191607 | |
| DATED | : April 1, 2025 | |
| INVENTOR(S) | : Renny Komppa et al. | |

It is certified that error appears in the above-identified patent and that said Letters Patent is hereby corrected as shown below:

On the Title Page

Column 1, item (22):
"Filed: Mar. 30, 2022"
Should read:
--Filed: Mar. 28, 2023--

Signed and Sealed this
Twenty-first Day of October, 2025

John A. Squires
*Director of the United States Patent and Trademark Office*